United States Patent
Nanda (10) Patent No.: US 10,601,864 B1
(45) Date of Patent: Mar. 24, 2020

(54) USING DISPOSABLE PROFILES FOR PRIVACY IN INTERNET SESSIONS

(71) Applicant: Symantec Corporation, Mountain View, CA (US)

(72) Inventor: Susanta K. Nanda, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 80 days.

(21) Appl. No.: 15/725,673

(22) Filed: Oct. 5, 2017

(51) Int. Cl.
*H04L 29/06* (2006.01)

(52) U.S. Cl.
CPC ...... *H04L 63/1466* (2013.01); *H04L 63/0209* (2013.01); *H04L 63/0272* (2013.01)

(58) Field of Classification Search
CPC ............. H04L 63/1466; H04L 63/0272; H04L 63/0209
See application file for complete search history.

(56) References Cited

U.S. PATENT DOCUMENTS

| | | | |
|---|---|---|---|
| 8,281,377 B1* | 10/2012 | Snow | H04N 21/41407 726/7 |
| 9,444,839 B1* | 9/2016 | Faulkner | H04L 63/1466 |
| 2008/0115190 A1* | 5/2008 | Aaron | H04L 63/0227 726/1 |
| 2010/0175122 A1* | 7/2010 | Ballard | H04L 63/1466 726/12 |
| 2011/0035784 A1* | 2/2011 | Jakobsson | H04L 63/1466 726/2 |
| 2011/0162062 A1* | 6/2011 | Kumar | G06F 21/10 726/15 |
| 2014/0164768 A1* | 6/2014 | Kruglick | H04L 63/062 713/168 |
| 2015/0334566 A1* | 11/2015 | Selander | H04L 63/1466 455/411 |
| 2016/0294797 A1* | 10/2016 | Martin | H04L 63/0236 |
| 2017/0070534 A1* | 3/2017 | Bailey | H04L 67/02 |
| 2017/0180351 A1* | 6/2017 | Lu | H04L 63/061 |
| 2017/0237773 A1* | 8/2017 | Wallace | H04L 63/1425 726/22 |
| 2017/0244705 A1* | 8/2017 | Ha | H04L 63/0272 |

(Continued)

OTHER PUBLICATIONS

SudoApp—free calls, https://sudoapp.com/features/. Accessed Sep. 21, 2017.

(Continued)

*Primary Examiner* — Cheng-Feng Huang
(74) *Attorney, Agent, or Firm* — Holland & Hart LLP (57) ABSTRACT

A method for applying user profiles in electronic sessions is described. In one embodiment, the method includes detecting a request to initiate an electronic session with a web server; identifying a user profile associated with the request; generating an alternative profile; initiating the electronic session; and replacing the user profile with the alternative profile during the electronic session. In some examples, the method includes performing a security action, including modifying one or more data points in a set of metadata and/or a set of latent user characteristics associated with the user profile. In some cases, the alternative profile includes a set of modified metadata and a set of modified latent user characteristics. In some examples, the method includes replacing a cookie associated with the user profile with a cookie associated with the alternative profile.

14 Claims, 7 Drawing Sheets

(56) References Cited

U.S. PATENT DOCUMENTS

2017/0346853 A1* 11/2017 Wyatt .................... G06F 21/56
2018/0013788 A1* 1/2018 Vissamsetty ........ H04L 63/1466

OTHER PUBLICATIONS

Tor: Overview; https://www.torproject.org/about/overview.html.en. Accessed Aug. 17, 2017.

\* cited by examiner

USING DISPOSABLE PROFILES FOR PRIVACY IN INTERNET SESSIONS

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The wide-spread use of computers and mobile devices has caused an increased presence of profile information for a user. In some cases, an entity may covertly gather and/or maliciously use profile information associated with a user.

SUMMARY

According to at least one embodiment, a method using disposable profiles for privacy in internet sessions is described. In one embodiment, the method may include detecting a request to initiate an electronic session with a web server, identifying a user profile associated with the request, generating an alternative profile, initiating the electronic session, and replacing the user profile with the alternative profile during the electronic session.

In some embodiments, the method may include performing a security action. In some cases, performing the security action may include modifying one or more data points in a set of metadata and/or a set of latent user characteristics associated with the user profile. In some examples, the alternative profile may include a set of modified metadata and a set of modified latent user characteristics.

In some embodiments, the set of modified metadata and the set of modified latent user characteristics may include at least one of: a modified client-side fingerprint, a modified geolocation, a modified website history, a modified list of search terms, a modified browser identifier, a modified operating system identifier, a modified client machine identifier, a modified list of system fonts, a modified browser font, a modified browser plugin, a modified display characteristic, a modified canvas and/or WebGL fingerprint, a modified audio capability, a modified time zone, a modified language support, a modified touch support, or a combination thereof.

In some embodiments, the method may include determining that a subset of metadata and a subset of latent user characteristics request user input, transmitting a message requesting input for the subset of metadata and the subset of latent user characteristics, receiving user input in response to the transmitted message and incorporating the received user input with the modified one or more data points in the set of metadata and/or the set of latent user characteristics associated with the user profile.

In some embodiments, the modifying of the one or more data points in the set of metadata and/or the set of latent user characteristics associated with the user profile may include at least one of changing data, adding data, removing data, or any combination thereof.

In some embodiments, generating the alternative profile may include selecting the alternative profile from a set of alternative profiles. Additionally or alternatively, the method may include transmitting a request to create the set of alternative profiles, and receiving the set of alternative profiles based at least in part on the transmitted request.

Additionally or alternatively, the initiated session may include an authenticated session. In some cases, the alternative profile may be used to gain access to the authenticated session.

In some embodiments, the method may include identifying a command to use the user profile in the initiated session instead of the alternative profile. In some cases, replacing the user profile with the alternative profile may include preserving the user profile. In some examples, the user profile or the alternative profile may be implemented transparently in the initiated session, the web server receiving information and determining the received information is associated with the user profile regardless of whether the information is associated with the user profile or the alternative profile.

In some embodiments, the detecting, the identifying, the generating, and the replacing are performed by a man in the middle (MITM) entity. In some cases, the MITM entity may reside on a demilitarized zone (DMZ) server, a virtual private network (VPN) server, a browser plug-in, a custom browser server, an enterprise router or access point, a home router or access point, a vehicular router or access point, or a host agent.

A computing device configured for using disposable profiles for privacy in electronic sessions is also described. The computing device may include one or more processors and memory in electronic communication with the one or more processors. The memory may store computer executable instructions that when executed by the one or more processors cause the one or more processors to perform the steps of detecting a request to initiate an electronic session with a web server, identifying a user profile associated with the request, generating an alternative profile, initiating the electronic session, and replacing the user profile with the alternative profile during the electronic session.

A computer-program product for using disposable profiles for privacy in electronic sessions is also described. The computer-program product may include a non-transitory computer-readable medium storing instructions thereon. When the instructions are executed by one or more processors, the execution of the instructions may cause the one or more processors to perform the steps of detecting a request to initiate an electronic session with a web server a user profile associated with the request, generating an alternative profile, initiating the electronic session, and replacing the user profile with the alternative profile during the electronic session.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to using disposable profiles for privacy in electronic sessions. More specifically, the systems and methods described herein relate to generating an alternative profile and replacing a user profile with the generated alternative profile.

Profiling users in an internet session is increasingly becoming a concern for privacy-aware users. Profile information may include information which the user may not want other entities to collect, as this information may be provided to other entities which the user may wish to be hidden from. Some entities may use profile information to obtain further information and context about a user. In some cases, entities may use this profile information to determine the identity of the user. Profiling companies may identify users using various characteristics of their internet sessions and then may correlate to data acquired previously—either on their own or from a third party—to enhance their profile for targeted marketing and/or sales campaign. Examples of such data may include client-side fingerprinting information, geolocation, websites visited, and search terms. Even when a user is not uniquely identified, such as in an unauthenticated session, the data may allow profilers to drastically reduce the search space to a handful of individuals which then may be used with future data to uniquely identify the user. When some of this user data is shared with entities that the user wants to hide from, it may lead to adverse consequences.

User profiles may also be stored in browser form auto-fill, OS and middleware password and data storage support, and similar technologies. However, these technologies may not provide any automatic replacement or privacy-oriented features.

Temporary/disposable profiles may allow for replacement of the original profile information. This replacement may be conducted transparently using a proxy server, a browser plug-in, or similar technology, which may allow for entropy management, thus making it difficult if not impossible for an associated server to identify the real user. The temporary profiles may be created and destroyed, changed for every session of the user, and may be used for different users at different times.

Many modern internet services may collect as much information as possible from their users in order to provide a more personalized experience. However, thus information collecting also enables internet services to use the information for purposes that may not be in the user's interest—and at times, even detrimental to the user. Most of the time, the services may require a user to create a profile by signing up to avail the service and then remember the profile using technologies such as HTTP cookies to make session access seamless for future use. Even when a user does not sign up, the services may still find ways to uniquely identify the user and track user for better profiling. Disposable and/or temporary profiles may provide users a technique to manage their privacy when they wish in a transparent fashion, unbeknownst to an associated web server, and with minimal effort.

The techniques described herein propose to replace a user profile in an internet session by a temporary/disposable profile in order to hide the real identity of the user. When a user makes a request (e.g. a web search) to a website with an authorization cookie, a man-in-the-middle (MITM) software, such as a web proxy or a browser plugin, may transparently replace the cookie with another cookie that represents a profile with no real user associated with it (e.g., a "fake" profile). The fake user profiles may be created automatically by the MITM when possible, or the MITM may request a user to provide information that may be difficult to automate, such as solving a CAPTCHA. Once such a fake profile is created, it may be reused for many different user sessions, and may be retired, or modified. The profile information may be used to control the level of entropy—and thus, the level of deception—the user, the enterprise, or the privacy provider wishes.

The MITM may be deployed as a proxy in an enterprise DMZ, integrated into a personal VPN service, as a browser plugin, or embedded into a custom browser itself. A central server may be used to synchronize the profiles with the central repository where they may be managed. The user interface may be provided as a "super private" mode/button in the browser, an app setting, or something similar. The underlying implementation may select to use a custom HTTP extension header, an out-of-band channel set up with the MITM, or similar technologies. When a user wants to use his/her own profile instead of the disposable profile, he/she may disable the mode using whatever user interface has been provided.

In some situations, a user may interact with the service without signing up, i.e., in an unauthenticated mode. In these situations, the user may still be identified/profiled by the server using metadata and latent characteristics such as browser fingerprint, entity tags, geolocation, and a device identifier. Some of these may use an application programming interface (API) (e.g., HTML5 JavaScript APIs, etc.) to collect information inside the browser and then may transmit this information via HTTP POST input fields or query strings in a GET request. Examples of collected information may include geolocation (e.g., navigator.geolocation), a HTML5 canvas and a Web Graphics Library (WebGL) fingerprint, and platform and system information.

The method described herein may apply a wrapper object (e.g., a JavaScript wrapper) for the APIs that collect information from the browser, and may modify the return values. For example, the API getCurrentPosition( ) in the navigator.geolocation object may be wrapped to modify the location coordinates returned by the function to a coarser location (e.g. somewhere in the same city/zip/state), or an entirely different location (in a different time zone or country). Similar mechanisms may be used for other information as well, such as platform/system information which may be streamlined to reduce uniqueness. Identifying information that is transmitted in HTTP headers may be dealt with similarly. For instance, caching entity tags may be removed altogether, which may disallow any tracking that use entity tags (eTags). In some cases, an eTag may include an opaque identifier assigned by a web server to a specific version of a resource found at a URL. When the resource representation at that URL changes, a new and different eTag may be assigned. Used in this manner eTags may be similar to fingerprints, and may be quickly compared to determine whether two representations of a resource are the same. In another example, a user agent header may be streamlined to a generic platform identifier, thus reducing its uniqueness. More generally, the methods described herein may minimize the distinguishing power of the data by removing the data when possible, or using a more generic value or a fuzzed value.

Figure 1:
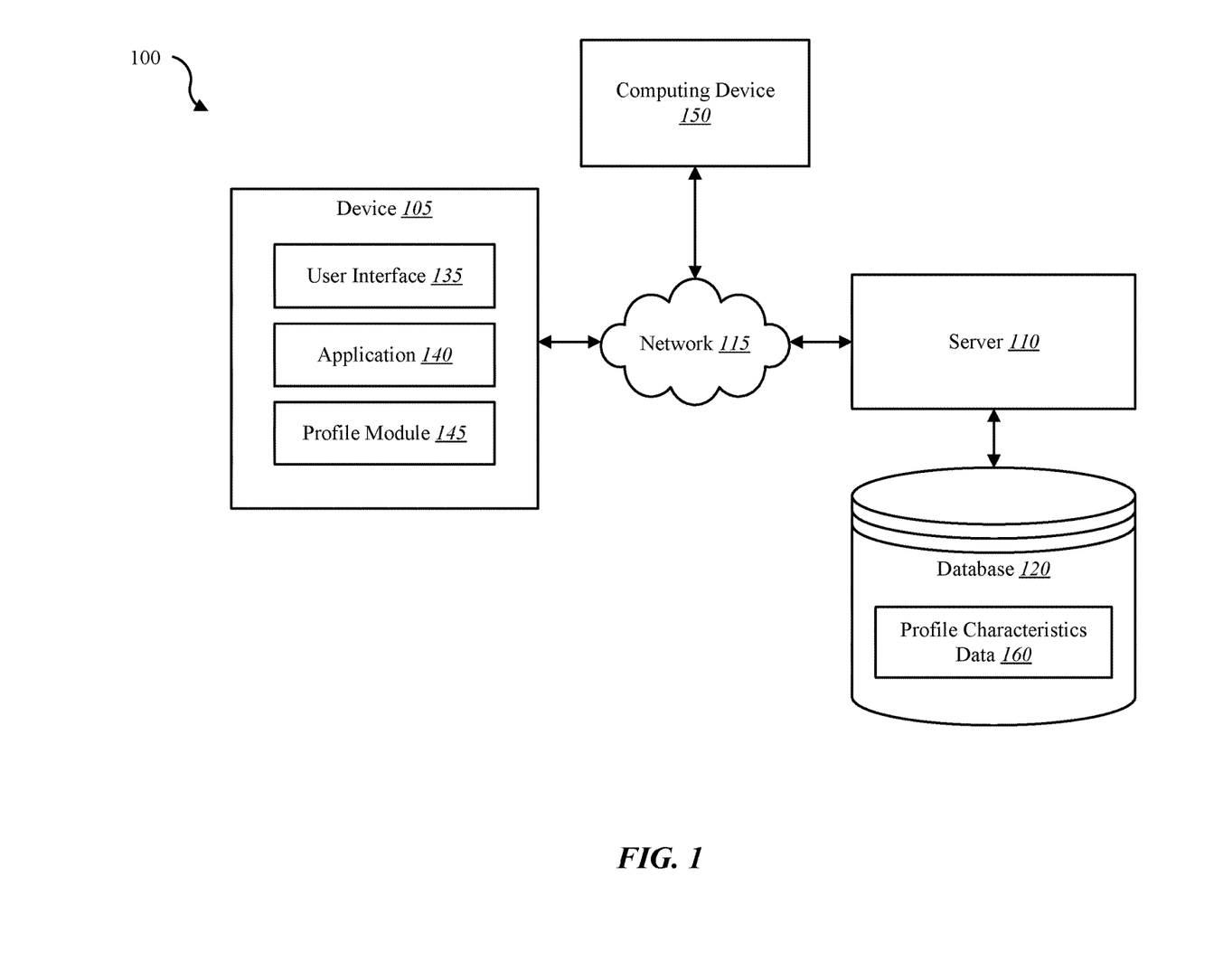
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a computing device 150, and a network 115 that allows the device 105, the server 110, the computing device 150, and to communicate with one another.

Examples of the device 105 may include any combination of mobile devices, smart phones, personal computing devices, computers, laptops, desktops, servers, media content set top boxes, digital video recorders (DVRs), or any combination thereof.

Examples of computing device 150 may include at least one of one or more client machines, one or more mobile computing devices, one or more laptops, one or more desktops, one or more servers, one or more media set top boxes, or any combination thereof. Examples of server 110 may include any combination of a data server, a cloud server, proxy server, mail server, web server, application server, database server, communications server, file server, home server, mobile server, name server, or any combination thereof. Although computing device 150 is depicted as connecting to device 105 via network 115, in one embodiment, device 105 may connect directly to computing device 150. In some cases, device 105 may connect or attach to computing device 150 and/or server 110 via a wired and/or wireless connection. In some cases, device 105 may attach to any combination of a port, socket, and slot of computing device 150 and/or server 110.

In some configurations, the device 105 may include a user interface 135, application 140, and profile module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, profile module 145, computing device 150, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include profile module 145. For example, device 105 may include application 140 that allows device 105 to interface with a separate device via a profile module 145 located on another device such as computing device 150 and/or server 110. In some embodiments, device 105, computing device 150, and server 110 may include profile module 145 where at least a portion of the functions of profile module 145 are performed separately and/or concurrently on device 105, computing device 150, and/or server 110. Likewise, in some embodiments, a user may access the functions of device 105 (directly or through device 105 via profile module 145) from computing device 150. For example, in some embodiments, computing device 150 includes a mobile application that interfaces with one or more functions of device 105, profile module 145, and/or server 110.

In some embodiments, server 110 may be coupled to database 120. Database 120 may be internal or external to the server 110. In one example, device 105 may be coupled to database 120. For example, in one embodiment database 120 may be internally or externally connected directly to device 105. Additionally or alternatively, database 120 may be internally or externally connected directly to computing device 150 and/or one or more network devices such as a gateway, switch, router, intrusion detection system, etc. Database 120 may include profile characteristics data 160. As one example, device 105 may access the profile characteristics data 160 in database 120 over network 115 via server 110. Profile characteristics data 160 may include data regarding user characteristics associated with a user profile and/or metadata associated with a user profile.

Profile module 145 may enable the generation of an alternative user profile to use in an electronic session. In some embodiments, profile module 145 may be configured to perform the systems and methods described herein in conjunction with user interface 135 and application 140. User interface 135 may enable a user to interact with, control, and/or program one or more functions of profile module 145. Further details regarding the profile module 145 are discussed below.

Figure 2:
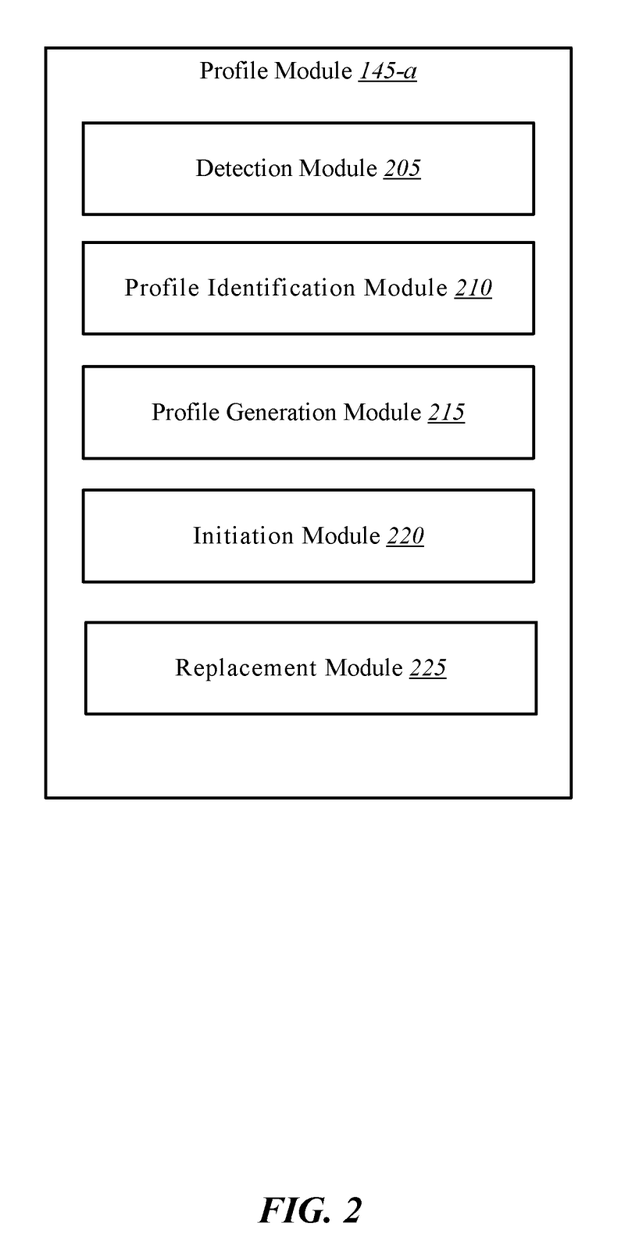
FIG. 2 is a block diagram illustrating one example of one or more modules in accordance with various aspects of this disclosure.

FIG. 2 is a block diagram illustrating one example of profile module 145-*a*. Profile module 145-*a* may be one example of profile module 145 depicted in FIG. 1. As depicted, profile module 145-*a* may include a detection module 205, a profile identification module 210, a profile generation module 215, an initiation module 220, and a replacement module 225.

In one embodiment, detection module 205 may detect a request to initiate an electronic session. The request may be implemented by a user via a device, such as device 105 or 150, to gain access to the contents of a server. Alternatively, the request may be received by a device, such as device 105 or 150 to initiate a session with another entity. The detection module 205 may detect this transmission or reception of a request to initiate an electronic session. The electronic session may include any number of electronic sessions, including but not limited to a Hypertext Transfer Protocol (HTTP) session, a Session Initiation (SIP) communication, or a Transmission Control Protocol (TCP) session.

Profile identification module 210 may identify a profile associated with the session initiation request. The profile may include various data and metadata associated with the session initiation request, a device that receives or transmits the request, or a user of a device used to transmit or receive the request. The various data and metadata associated with the session initiation request may include a client-side fingerprint, a geolocation, a website history, a list of search terms, a browser identifier, an operating system identifier, a client machine identifier, a list of system fonts, a browser font, a browser plugin, a display characteristic, a canvas and/or WebGL fingerprint, an audio capability, a time zone, a language support, a touch support, or a combination thereof.

Profile generation module 215 may generate an alternative profile for use in the session. The profile generation module 215 may modify data points of the identified profile to create a new alternative profile. Alternatively, the profile generation module 215 may randomly select data points in one or more categories of profile associated characteristics and/or metadata in order to generate an alternative profile. Alternatively, in some embodiments, the profile generation module 215 may select an alternative from a list of alternative profiles to use in the session. In these embodiments, the list of alternative profiles may include alternative profiles previously created by the profile generation module 215, alternative profiles created by a user via a device, such as device 105 or 150, or a combination thereof.

In some cases, the profile generation module 215 may request user input for at least a portion of an alternative profile. For example, when the portion of the alternative profile may be difficult to modify or when the alternative profile may be used to gain access to the requested electronic session. In such a case, the profile generation module 215 may generate and transmit a message to a user, such as via device 105 or 150, in order to receive user input. Based on the message, the profile generation module 215 may receive the user input and may include the user input in the alternative profile, or alternatively include the user input in generating the alternative profile for the requested session.

The initiation module 220 may initiate the requested session. In some embodiments, the initiation module 220 may initiate the requested session by connecting the user, such as via device 105 or 150, to a session connection. Additionally or alternatively, the initiation module 220 may receive a session validation message from the entity which received the session request message, and the initiation module 220 may initiate the session based on the received session validation message. Additionally or alternatively, the initiation module 220 may receive the session request, and may initiate the session by validating the session request and/or transmitting a session validation message. Additionally or alternatively, the session may request a login in order to gain access to the requested session. In these cases, the initiation module 220 may provide the requested login automatically or via user input. Additionally, in these cases the requested login may include a portion of the user profile. In these cases, the initiation module 220 may provide a portion of the generated alternative profile as the requested login.

The replacement module 225 may replace the user profile with the generated alternative profile for use in the requested electronic session. In some embodiments, the alternative profile is displayed as profile data within various messages transmitted during the initiated session. Additionally or alternatively, the alternative profile may be transmitted in the initiated session as a cookie associated with the initiated session, such as a session identifier.

Profile module 145-*a* and/or at least some of its various subcomponents may be implemented in hardware, software executed by a processor, firmware, or any combination thereof. If implemented in software executed by a processor, the functions of the profile module 145-*a* and/or at least some of its various subcomponents may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The profile module 145-*a* and/or at least some of its various subcomponents may be physically located at various positions, including being distributed such that portions of functions are implemented at different physical locations by one or more physical devices. In some examples, profile module 145-*a* and/or at least some of its various subcomponents may be a separate and distinct component in accordance with various aspects of the present disclosure. In other examples, profile module 145-*a* and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Figure 3:
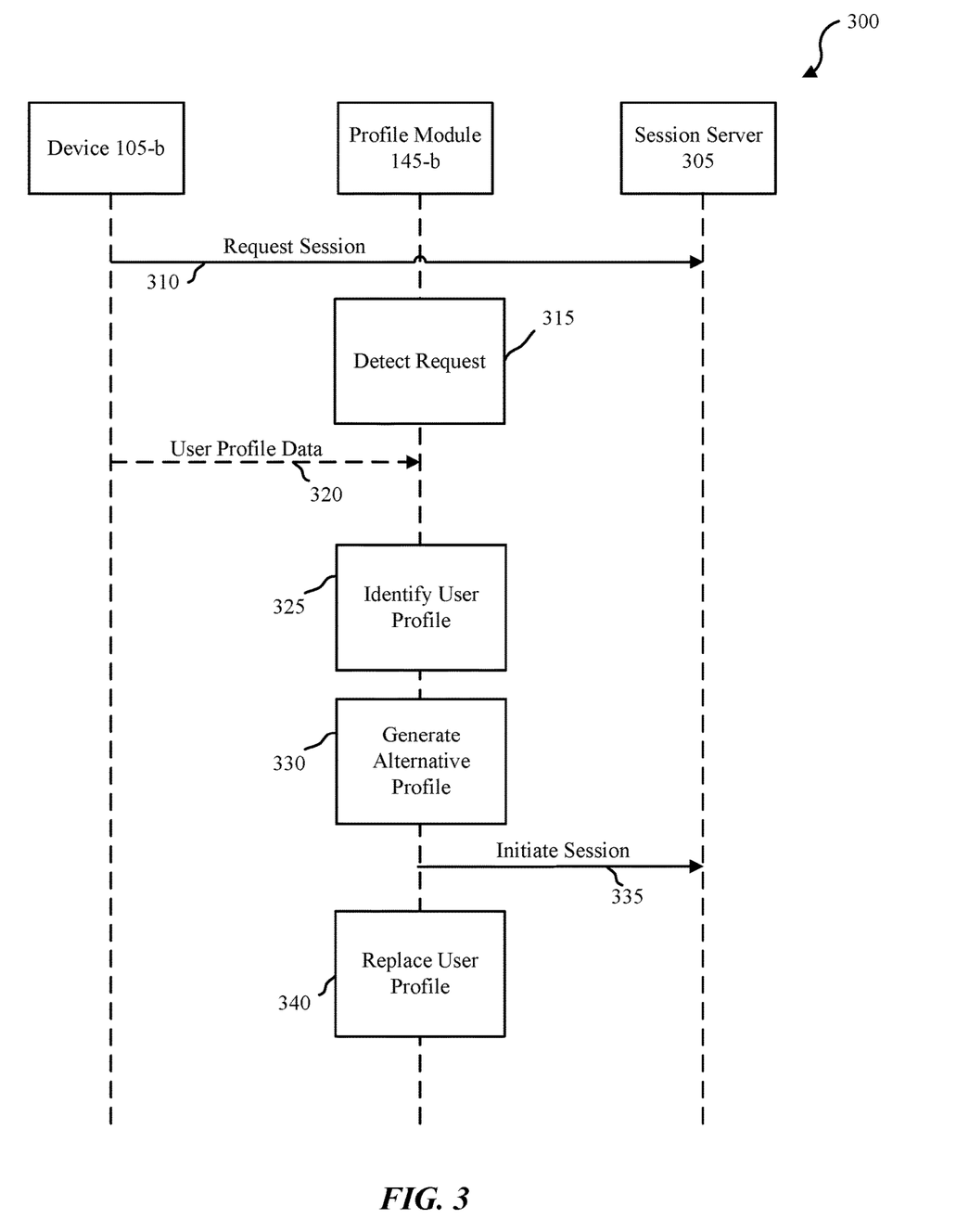
FIG. 3 shows a block diagram of a data flow in accordance with various aspects of this disclosure.

FIG. 3 is a block diagram illustrating one example of an environment 300 for using disposable profiles for privacy in electronic sessions. In some configurations, the environment 300 may be implemented by the profile module 145 illustrated in FIGS. 1 and/or 2. In some configurations, the environment 300 may be implemented in conjunction with device 105, server 110, network 115, database 120, components thereof, or any combination thereof.

As depicted, device 105-*b* may transmit a request 310 to initiate an electronic session with session server 305. The request 310 may be implemented by a user via the device 105-*b*, to gain access to the contents of the session server 305. Additionally or alternatively, the request 310 may be transmitted by device the 150 in lieu of the device 105-*b*. Additionally or alternatively, the request 310 may be received by the device 105-*b* to initiate a session with the session server 305. The requested electronic session may include any number of electronic sessions, including but not limited to a Hypertext Transfer Protocol (HTTP) session, a Session Initiation (SIP) communication, or a Transmission Control Protocol (TCP) session.

The profile module 145-*b* may detect the request 315 to initiate a session. Optionally, the profile module 145-*b* may receive data 320 associated with a user profile to be used in the requested session.

The profile module 145-*b* may identify a user profile to be used in the requested electronic session. The identification 325 may be based on the transmitted user profile data 320. Alternatively, the identification 325 may be based on the requested session message 310. The user profile may include various data and metadata associated with the session initiation request, a device that receives or transmits the request, or a user of a device used to transmit or receive the request. The various data and metadata associated with the session initiation request may include a client-side fingerprint, a geolocation, a website history, a list of search terms, a browser identifier, an operating system identifier, a client machine identifier, a list of system fonts, a browser font, a browser plugin, a display characteristic, a canvas and/or WebGL fingerprint, an audio capability, a time zone, a language support, a touch support, or a combination thereof.

The profile module 145-*b* may generate an alternative profile 330 for use in the requested session. The generation 330 may include modification of data points of the identified profile to create a new alternative profile. Alternatively, the generation 330 may include randomly selecting data points in one or more categories of the profile associated characteristics and/or metadata in order to generate an alternative profile. Alternatively, in some embodiments, the generation 330 may include selecting an alternative from a list of alternative profiles to use in the session. In these embodiments, the list of alternative profiles may include alternative profiles previously created by the profile module 145-*b*, alternative profiles created by a user via a device, such as device 105 or 150, or a combination thereof.

The profile module 145-*b* may initiate the requested session 335 with the session server 305. In some embodiments, the initiation 335 connect the user, such as via device 105-*b*, to a session connection. Additionally or alternatively, the initiation 335 may include receiving a session validation message from the session server 305.

The profile module 145-*b* may replace the user profile with the alternative profile 340 for use in the initiated electronic session. In some embodiments, the alternative profile is displayed as profile data within various messages transmitted during the initiated session. Additionally or alternatively, the alternative profile may be transmitted in the initiated session as a cookie associated with the initiated session, such as a session identifier. Additionally or alternatively, the replacement 340 may include preserving the user profile for use in the initiated session based on receiving a command to use the user profile.

Figure 4:
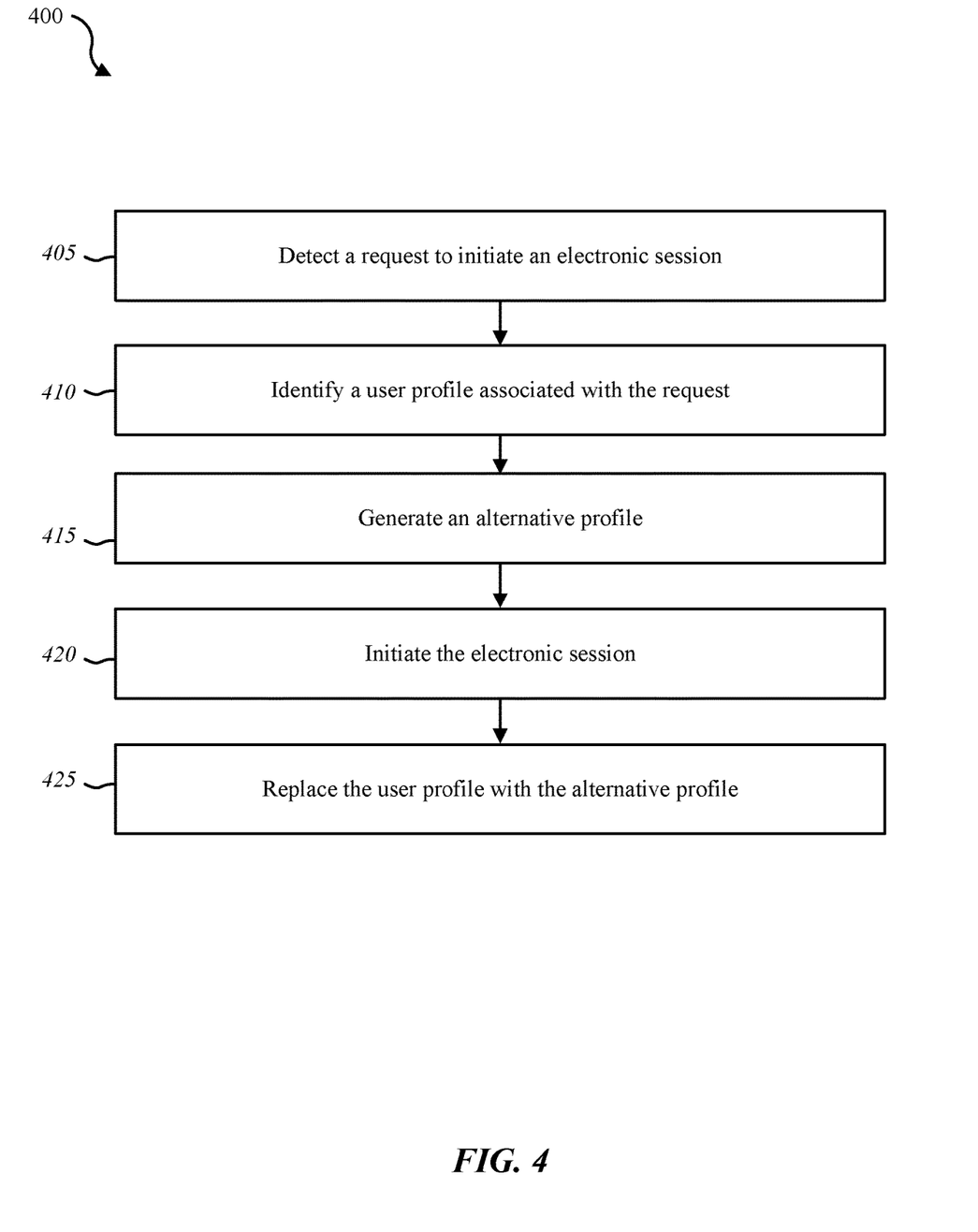
FIG. 4 is a flow diagram illustrating one embodiment of a method in accordance with various aspects of this disclosure.

FIG. 4 is a flow diagram illustrating one embodiment of a method 400 for using disposable profiles for privacy in electronic sessions. In some configurations, the method 400 may be implemented by the profile module 145 illustrated in FIGS. 1 and/or 2. In some configurations, the method 400 may be implemented in conjunction with device 105, server 110, network 115, database 120, components thereof, or any combination thereof.

At block 405, the profile module 145 may detect a request to initiate an electronic session with a web server. The operations of block 405 may be performed according to the methods described herein. In certain examples, aspects of the operations of block 405 may be performed by a detection module as described with reference to FIG. 2.

At block 410, the profile module 145 may identify a user profile associated with the request. The operations of block 410 may be performed according to the methods described herein. In certain examples, aspects of the operations of block 410 may be performed by a profile identification module as described with reference to FIG. 2.

At block 415, the profile module 145 may generate an alternative profile. The operations of block 415 may be performed according to the methods described herein. In certain examples, aspects of the operations of block 415 may be performed by a profile generation module as described with reference to FIG. 2.

At block 420, the profile module 145 may initiate the electronic session. The operations of block 420 may be performed according to the methods described herein. In certain examples, aspects of the operations of block 420 may be performed by an initiation module as described with reference to FIG. 2.

At block 425, the profile module 145 may replace the user profile with the alternative profile during the electronic session. The operations of block 425 may be performed according to the methods described herein. In certain examples, aspects of the operations of block 425 may be performed by a replacement module as described with reference to FIG. 2.

Figure 5:
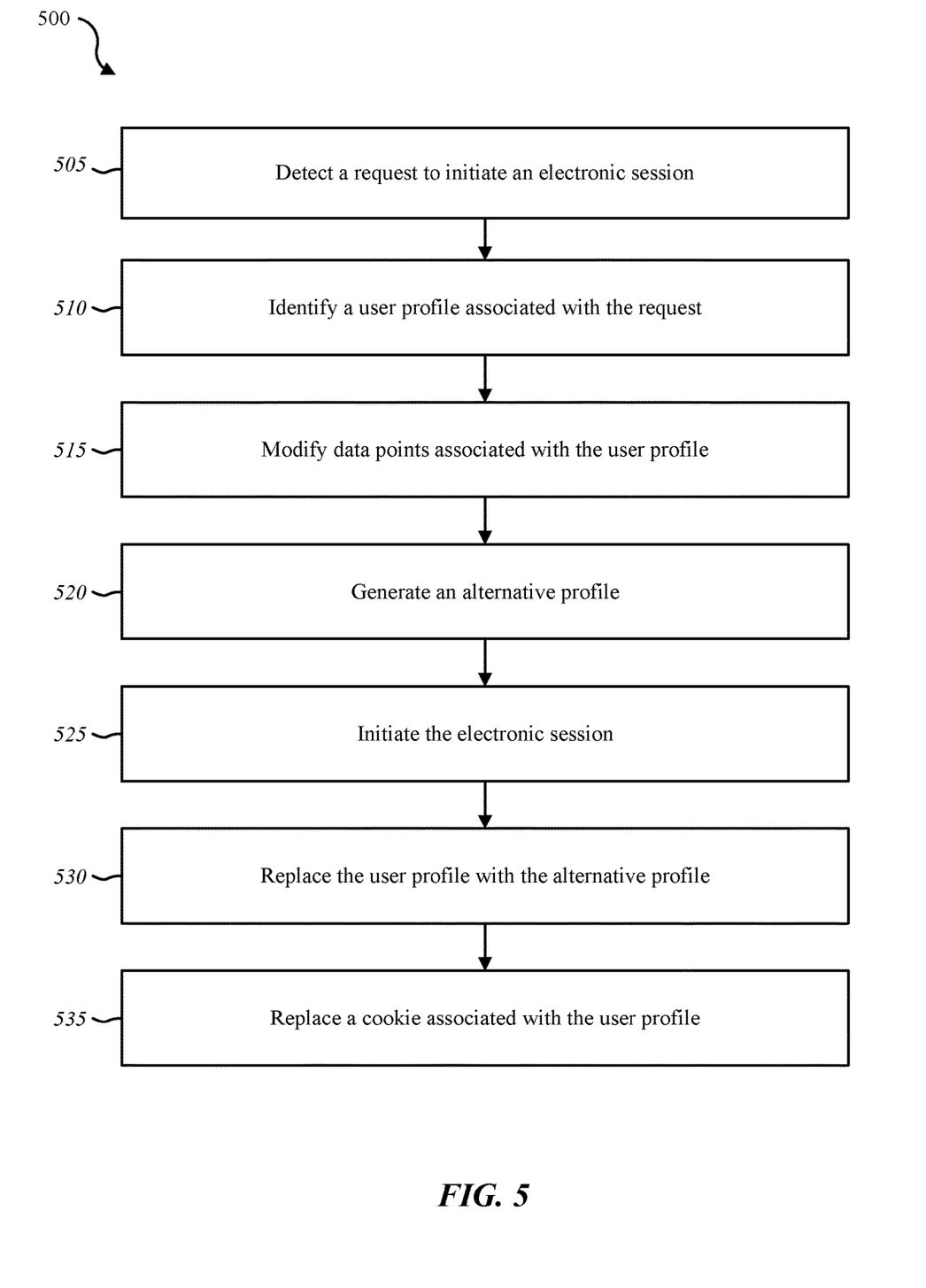
FIG. 5 is a flow diagram illustrating one embodiment of a method in accordance with various aspects of this disclosure.

FIG. 5 is a flow diagram illustrating one embodiment of a method 500 for using disposable profiles for privacy in electronic sessions. In some configurations, the method 500 may be implemented by the profile module 145 illustrated in FIG. 1 or 2. In some configurations, the method 500 may be implemented in conjunction with device 105, server 110, network 115, database 120, components thereof, or any combination thereof.

At block 505, the profile module 145 may detect a request to initiate an electronic session with a web server. The operations of block 505 may be performed according to the methods described herein. In certain examples, aspects of the operations of block 505 may be performed by a detection module as described with reference to FIG. 2.

At block 510, the profile module 145 may identify a user profile associated with the request. The operations of block 510 may be performed according to the methods described herein. In certain examples, aspects of the operations of block 510 may be performed by a profile identification module as described with reference to FIG. 2.

At block 515, the profile module 145 may performing a security action, where performing the security action may include modifying one or more data points in a set of metadata and/or a set of latent user characteristics associated with the user profile. The operations of block 515 may be performed according to the methods described herein. In certain examples, aspects of the operations of block 515 may be performed by a profile generation module as described with reference to FIG. 2.

At block 520, the profile module 145 may generate an alternative profile. The generated alternative profile may include a set of modified metadata and a set of modified latent user characteristics. The operations of block 520 may be performed according to the methods described herein. In certain examples, aspects of the operations of block 520 may be performed by a profile generation module as described with reference to FIG. 2.

At block 525, the profile module 145 may initiate the electronic session. The operations of block 525 may be performed according to the methods described herein. In certain examples, aspects of the operations of block 525 may be performed by an initiation module as described with reference to FIG. 2.

At block 530, the profile module 145 may replace the user profile with the alternative profile during the electronic session. The operations of block 530 may be performed according to the methods described herein. In certain examples, aspects of the operations of block 530 may be performed by a replacement module as described with reference to FIG. 2.

At block 535, the profile module 145 may replace a cookie associated with the user profile with a cookie associated with the alternative profile. The operations of block 535 may be performed according to the methods described herein. In certain examples, aspects of the operations of block 535 may be performed by a replacement module as described with reference to FIG. 2.

Figure 6:
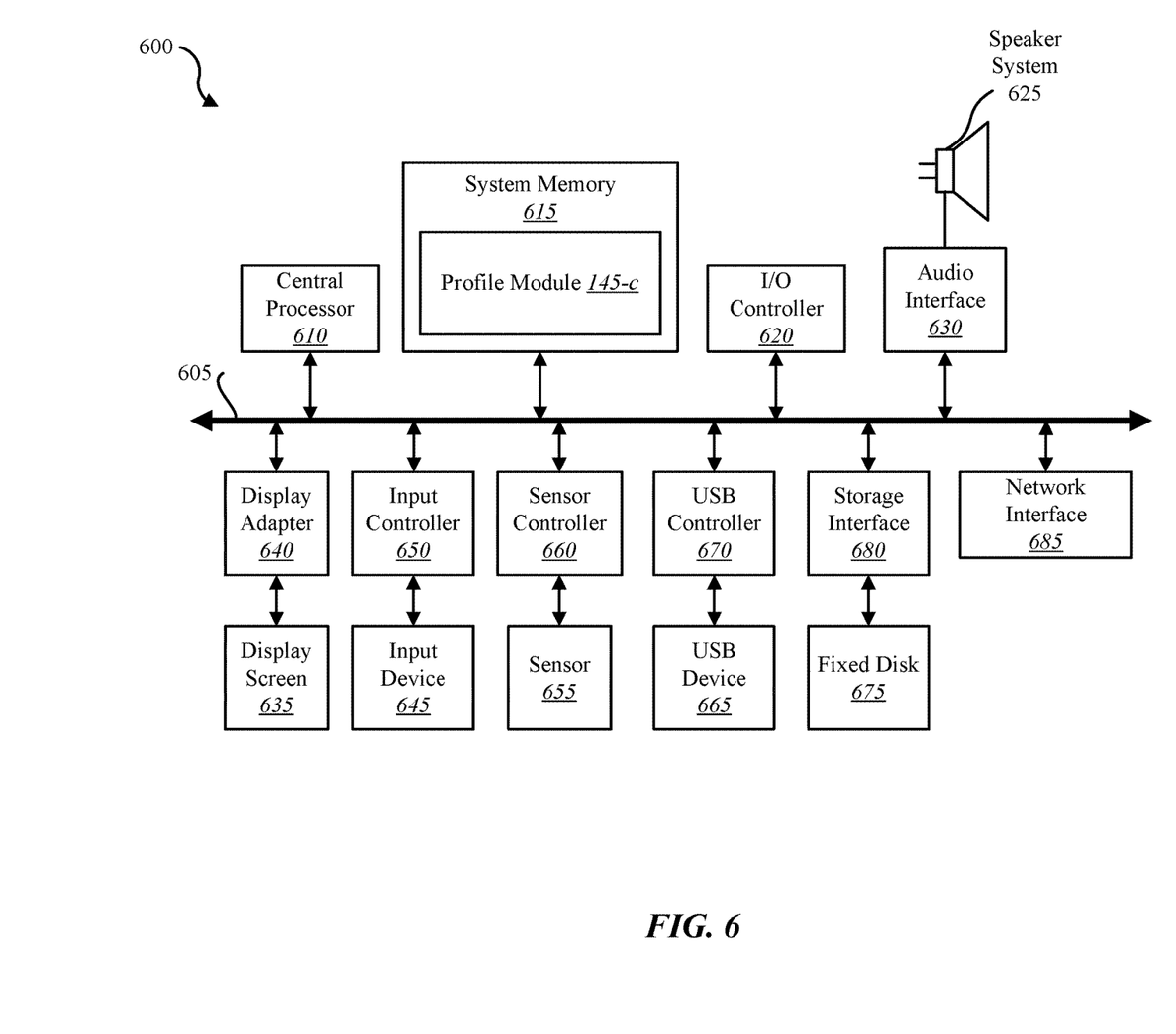
FIG. 6 depicts a block diagram of a computer system suitable for implementing the present systems and methods.

FIG. 6 depicts a block diagram of a computing device 600 suitable for implementing the present systems and methods. The device 600 may be an example of device 105, computing device 150, and/or server 110 illustrated in FIG. 1. In one configuration, device 600 includes a bus 605 which interconnects major subsystems of device 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the profile module 145-c to implement the present systems and methods may be stored within the system memory 615. Applications (e.g., application 140) resident with device 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of device 600, can connect to a standard computer readable medium for storage and/or retrieval of information, such as a fixed disk drive 675. Fixed disk drive 675 may be a part of device 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 600 wirelessly via network interface 685.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on device 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 600 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 685 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 620 may operate in conjunction with network interface 685 and/or storage interface 680. The network interface 685 may enable system 600 with the ability to communicate with client devices (e.g., device 105 of FIG. 1), and/or other devices over the network 115 of FIG. 1. Network interface 685 may provide wired and/or wireless network connections. In some cases, network interface 685 may include an Ethernet adapter or Fibre Channel adapter. Storage interface 680 may enable system 600 to access one or more data storage devices. The one or more data storage devices may include two or more data tiers each. The storage interface 680 may include one or more of an Ethernet adapter, a Fibre Channel adapter, Fibre Channel Protocol (FCP) adapter, a SCSI adapter, and iSCSI protocol adapter.

Figure 7:
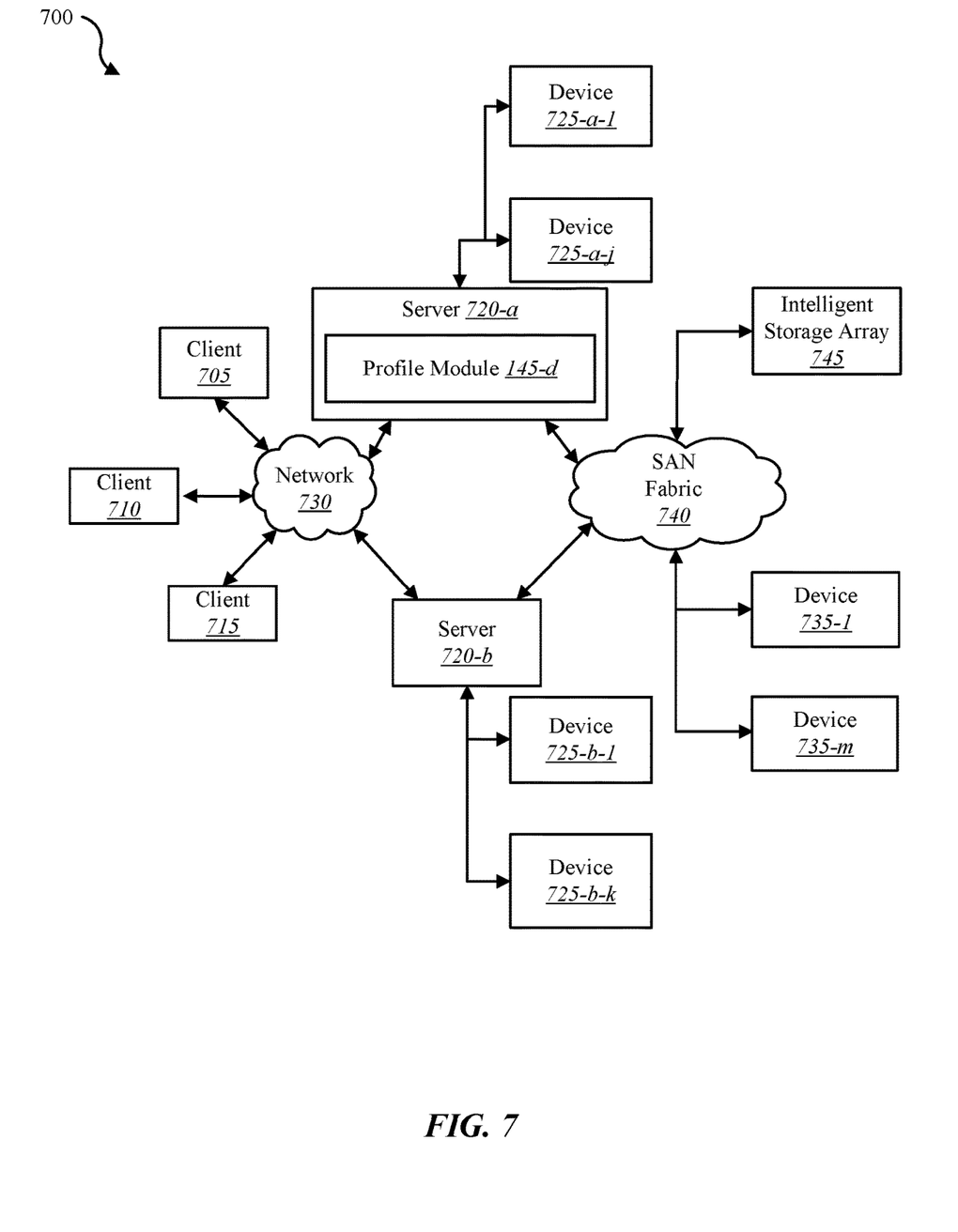
FIG. 7 depicts a block diagram of a computer system suitable for implementing the present systems and methods.

FIG. 7 is a block diagram depicting a network architecture 700 in which client systems 705, 710 and 715, as well as storage servers 720-a and 720-b (any of which can be implemented using computer system 600), are coupled to a network 730. In one embodiment, profile module 145-d may be located within one of the storage servers 720-a, 720-b to implement the present systems and methods. Profile module 145-d may be one example of profile module 145 depicted in FIGS. 1, 2, 3, and/or 6. The storage server 720-a is further depicted as having storage devices 725-a-1 through 725-a-j directly attached, and storage server 720-b is depicted with storage devices 725-b-1 through 725-b-k directly attached. SAN fabric 740 supports access to storage devices 735-1 through 735-m by storage servers 720-a and 720-b, and so by client systems 705, 710 and 715 via network 730. Intelligent storage array 745 is also shown as an example of a specific storage device accessible via SAN fabric 740.

With reference to computer system 600, network interface 685 or some other method can be used to provide connectivity from each of client computer systems 705, 710 and 715 to network 730. Client systems 705, 710 and 715 are able to access information on storage server 720-a or 720-b using, for example, a web browser or other client software (not shown). Such a client allows client systems 705, 710 and 715 to access data hosted by storage server 720-a or 720-b or one of storage devices 725-a-1 to 725-a-j, 725-b-1 to 725-b-k, 735-1 to 735-m or intelligent storage array 745. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for applying user profiles in electronic sessions, the method being performed by one or more computing devices comprising at least one processor, the method comprising:

detecting, by the one or more computing devices, a request to initiate an electronic session with a web server;

identifying, by the one or more computing devices, a user profile associated with the request, the user profile associated with a user of the one or more computing devices;

generating, by the one or more computing devices, an alternative profile associated with a fake user;

initiating, by the one or more computing devices, the electronic session;

replacing, by the one or more computing devices, the user profile with the alternative profile during the electronic session;

replacing, by the one or more computing devices, a cookie associated with the user profile with a cookie associated with the alternative profile;

determining, by the one or more computing devices, that a subset of metadata and a subset of latent user characteristics request user input;

transmitting, by the one or more computing devices, a message requesting input for the subset of metadata and the subset of latent user characteristics;

receiving, by the one or more computing devices, user input in response to the transmitted message;

incorporating, by the one or more computing devices, the received user input with the modified one or more data points in the set of metadata and/or the set of latent user characteristics associated with the user profile; and performing, by the one or more computing devices, a security action, wherein performing the security action comprises modifying one or more data points in a set of metadata and/or a set of latent user characteristics associated with the user profile, wherein the alternative profile comprises a set of modified metadata and a set of modified latent user characteristics.

2. The method of claim 1, wherein the set of modified metadata and the set of modified latent user characteristics comprise at least one of: a modified client-side fingerprint, a modified geolocation, a modified website history, a modified list of search terms, a modified browser identifier, a modified operating system identifier, a modified client machine identifier, a modified list of system fonts, a modified browser font, a modified browser plugin, a modified display characteristic, a modified canvas and/or a web graphics library (WebGL) fingerprint, a modified audio capability, a modified time zone, a modified language support, a modified touch support, or a combination thereof.

3. The method of claim 1, wherein the modifying of the one or more data points in the set of metadata and/or the set of latent user characteristics associated with the user profile comprises at least one of changing data, adding data, removing data, or any combination thereof.

4. The method of claim 1, wherein generating the alternative profile comprises selecting the alternative profile from a set of alternative profiles.

5. The method of claim 4, further comprising:
transmitting a request to create the set of alternative profiles; and
receiving the set of alternative profiles based at least in part on the transmitted request.

6. The method of claim 4, wherein the initiated session comprises an authenticated session, and wherein the alternative profile is used to gain access to the authenticated session.

7. The method of claim 1, further comprising:
identifying a command to use the user profile in the initiated session instead of the alternative profile; and
wherein replacing the user profile with the alternative profile comprises preserving the user profile, wherein the user profile or the alternative profile is implemented transparently in the initiated session, the web server receiving information and determining the received information is associated with the user profile regardless of whether the information is associated with the user profile or the alternative profile.

8. The method of claim 1, wherein the detecting, the identifying, the generating, and the replacing are performed by a man in the middle (MITM) entity, and wherein the MITM entity resides on a demilitarized zone (DMZ) server, a virtual private network (VPN) server, a browser plug-in, a custom browser server, an enterprise router or access point, a home router or access point, a vehicular router or access point, or a host agent.

9. A computing device configured for applying user profiles in electronic sessions, comprising:
a processor;
memory in electronic communication with the processor;
instructions stored in the memory, the instructions being executable by the processor to:
detect a request to initiate an electronic session with a web server;
identify a user profile associated with the request, the user profile associated with a user of the computing device;
generate an alternative profile associated with a fake user;
initiate the electronic session;
replace the user profile with the alternative profile during the electronic session;
replace a cookie associated with the user profile with a cookie associated with the alternative profile;
determine that a subset of metadata and a subset of latent user characteristics request user input;
transmit a message requesting input for the subset of metadata and the subset of latent user characteristics;
receive user input in response to the transmitted message;
incorporate the received user input with the modified one or more data points in the set of metadata and/or the set of latent user characteristics associated with the user profile; and
perform a security action, wherein performing the security action comprises modifying one or more data points in a set of metadata and/or a set of latent user characteristics associated with the user profile, wherein the alternative profile comprises a set of modified metadata and a set of modified latent user characteristics.

10. The computing device of claim 9, wherein the set of modified metadata and the set of modified latent user characteristics comprise at least one of: a modified client-side fingerprint, a modified geolocation, a modified website history, a modified list of search terms, a modified browser identifier, a modified operating system identifier, a modified client machine identifier, a modified list of system fonts, a modified browser font, a modified browser plugin, a modified display characteristic, a modified canvas and/or a web graphics library (WebGL) fingerprint, a modified audio capability, a modified time zone, a modified language support, a modified touch support, or a combination thereof.

11. The computing device of claim 9, wherein the modifying of the one or more data points in the set of metadata and/or the set of latent user characteristics associated with the user profile comprises at least one of changing data, adding data, removing data, or any combination thereof.

12. The computing device of claim 9, wherein generating the alternative profile comprises selecting the alternative profile from a set of alternative profiles.

13. The computing device of claim 12, wherein the instructions are executable by the processor to:
transmit a request to create the set of alternative profiles; and
receive the set of alternative profiles based at least in part on the transmitted request.

14. A computer-program product for applying user profiles in electronic sessions, the computer-program product comprising a non-transitory computer-readable medium storing instructions thereon, the instructions being executable by a processor to:
detect a request to initiate an electronic session with a web server;
identify a user profile associated with the request, the user profile associated with a user of the computer-program;
generate an alternative profile associated with a fake user;
initiate the electronic session;
replace the user profile with the alternative profile during the electronic session;
replace a cookie associated with the user profile with a cookie associated with the alternative profile;
determine that a subset of metadata and a subset of latent user characteristics request user input;
transmit a message requesting input for the subset of metadata and the subset of latent user characteristics;
receive user input in response to the transmitted message;
incorporate the received user input with the modified one or more data points in the set of metadata and/or the set of latent user characteristics associated with the user profile; and
perform a security action, wherein performing the security action comprises modifying one or more data points in a set of metadata and/or a set of latent user characteristics associated with the user profile, wherein the alternative profile comprises a set of modified metadata and a set of modified latent user characteristics.

* * * * *